Sept. 3, 1968
J. L. VANNEST
3,399,937
BEARING RETAINER
Filed April 8, 1966
2 Sheets-Sheet 1
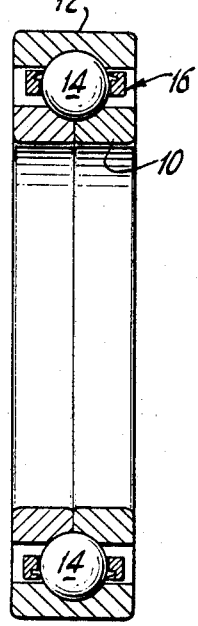
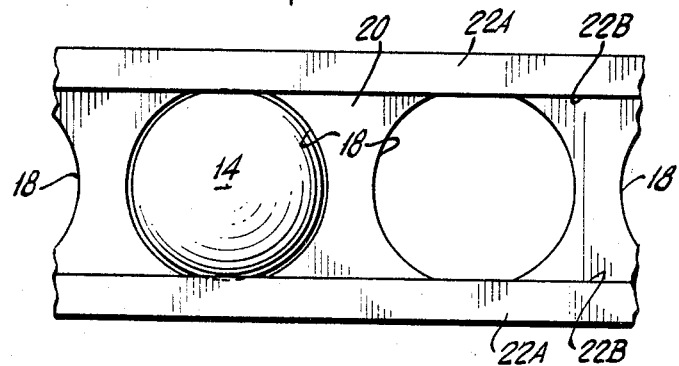
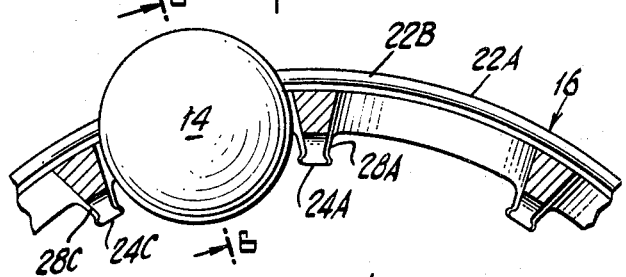
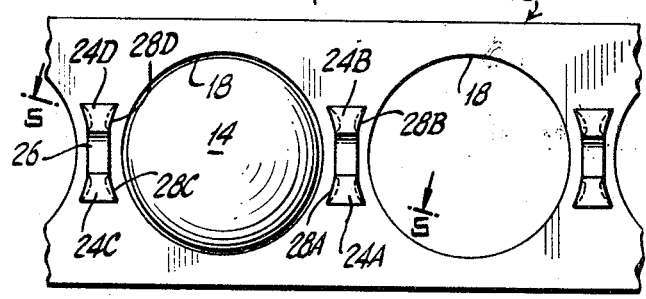
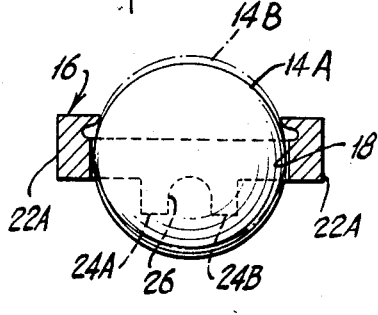
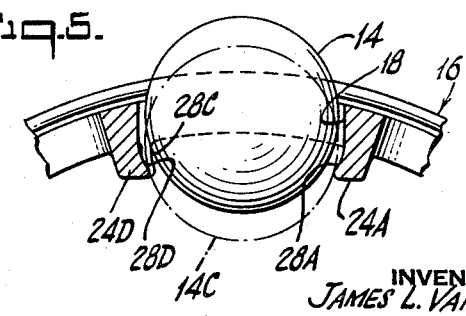
INVENTOR
JAMES L. VANNEST
BY
Hopgood & Calimafde
ATTORNEYS

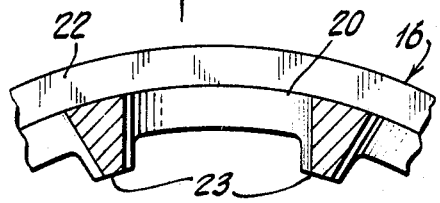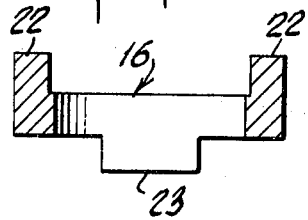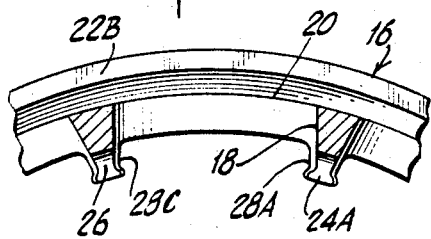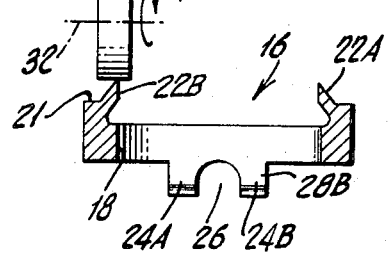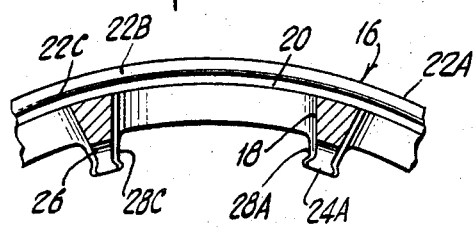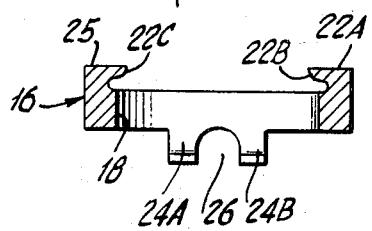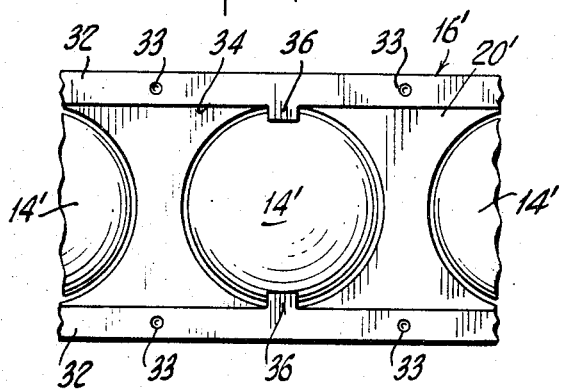

United States Patent Office 3,399,937
Patented Sept. 3, 1968

3,399,937
BEARING RETAINER
James L. Vannest, New Britain, Conn., assignor to The Fafnir Bearing Company, New Britain, Conn., a corporation of Connecticut
Filed Apr. 8, 1966, Ser. No. 541,308
5 Claims. (Cl. 308—201)

ABSTRACT OF THE DISCLOSURE

A ball-bearing retainer which includes a ring-like member having a plurality of radial holes for receiving balls, means between the holes extending radially inwardly from the ring body for restraining the balls from falling radially inwardly out of the retainer, and outer limit ball retention means exteding radially beyond the body of the ring, the retention means having substantially point contact engagement with the respective balls to prevent the same from falling radially outwardly out of the retainer.

---

This invention relates to a retainer for a bearing and to a method of manufacture therefor.

In the manufacture of conventional ball bearing retainer rings, considerable difficulty is experienced in controlling the amount of ball freedom or roll-out and also in providing a desired large amount of freedom, with ball retention means on the retainer. Furthermore, these features are extremely difficult and therefore costly, to provide in retainers of small size by means of conventional ring constructions and when they are provided, the desired degree of uniformity is not achieved nor is the desired degree of freedom or roll-out achieved.

Accordingly, it is an object of this invention to make available an improved ball bearing retainer which provides a significantly greater amount of ball freedom or roll-out for the balls and which still restrains the balls from falling freely out of the retainer.

Another object of the invention is to provide a retainer ring construction which will facilitate the incorporation of substantially improved ball roll-out or freedom in retainers of both large and small size.

One of the features of this invention is the provision of a retainer ring construction which makes possible large ball-to-pocket clearance and which is a significant improvement over conventional retention means for retaining the balls in the retainer.

All of the objects, features and advantages of the invention and the manner of attaining them will become more apparent and the invention itself will be best understood by reference to the following description of an embodiment of the invention taken in conjunction with the accompanying drawing, in which:

FIGURE 1 is a diametral sectional view through a ball bearing, showing one form of a retainer according to the invention, FIGURE 2 is a fragmentary development of a section of a retainer according to one embodiment of the invention, as viewed from the outside of the retainer, FIGURE 3 is a generally axially viewed section of a fragment of the retainer shown in FIGURE 2, FIGURE 4 is a fragmentary development of a section of the retainer of FIGURE 2 as viewed from the inside of the retainer, FIGURE 5 is a generally axially viewed section of a fragment of the retainer similar to FIG. 3, but taken on the line 5—5 of FIG. 4, FIGURE 6 shows a transverse section of the retainer taken on the line 6—6 of FIG. 3, FIGURES 7A and 7B show axial and transverse views respectively of the retainer ring of FIG. 2 prior to machining thereof, FIGURES 8A and 8B show axial and transverse views respectively similar to those of FIGS. 7A and 7B, but after machining of the retainer ring, FIGURES 9A and 9B show axial and transverse views respectively after a forming operation in accordance with the invention, and FIGURE 10 illustrates a bearing retainer construction according to a further embodiment of the invention.

Briefly stated, there is provided in accordance with one aspect of the invention an improved ball bearing retainer and a method for making the same wherein an annular ring is provided with a plurality of circumferentially spaced holes or pockets for retention of the balls. Between the pockets and extending generally radially inwardly are means, such as fingers, which are provided with suitable seats for restraining the balls in the pockets. These fingers are formed of such material and dimensions as to be sufficiently resilient to permit sideways elastic deformation thereof to allow the balls to be inserted into the pockets by urging the same in a radially outward direction. Upon the application of sufficient force, the balls "spread" the fingers sufficiently to allow the balls to "pop" into the pockets. The balls are then restrained against falling out of the pockets in an inwardly radial direction by return of the fingers to their unstressed or normal positions.

The balls are restrained from falling radially outwardly out of the retainer by restraining means associated with each ball pocket. In the finished retainer, such restraining means preferably take the form of ball retention flanges on opposite sides of the retainer ring which extend radially outwardly of the main body portion of the ring and have portions whirh provide point contact with the balls.

The retainer in its rough or original form preferably includes ball pockets which are slightly smaller than the diameter of the balls to be received therein. These pockets are then enlarged by means of a suitable pocket-enlarging tool, such as for example, a cherry reamer. This tool also forms generally spherical seats on the inwardly directed fingers between the pockets so that the balls may rest radially inwardly therein. The retainer in its rough or original form also includes a pair of spaced annular flange-like extensions thereon, which extend generally radially outwardly of the main body portion of the retainer. These flange-like extensions are then machined to form narrow, generally radially outwardly extending flanges which are then pressed radially inwardly. This latter operation is a cold-working operation whereby the flanges are relocated into a position whereby the same have flange edges which oppose or face each other. These edges are spaced from one another by a distance less than the diameter of the balls and in one embodiment form the outer limit ball retention means. In another embodiment, this means may take the form of flange extensions which are spaced from one another by a distance less than the diameter of the balls, and the flanges may comprise individual members which are assembled to the ring to thereby form the retainer.

Referring now to the drawing, FIG. 1 illustrates a complete ball bearing which embodies an inner ring 10 and an outer ring 12 with a plurality of balls 14 therebetween. The balls are held in a retainer 16 which may take a variety of specific forms in accordance with different embodiments of the invention. In the particular form shown in FIG. 1, the inner ring 10 comprises two half-sections held together in any manner well known to those skilled in the art.

FIGS. 2–6 show different views of the retainer 16 in accordance with a first embodiment of the invention. The retainer or ring 16 shown may be made of a variety of suitable materials such as, for example, bronze or steel, and is annular in shape. This retainer 16 is provided with circumferential equally spaced generally radial ball pockets 18, formed in the ring main body portion 20, for receiving the balls 14.

Annular flanges 22A are provided at the edges or sides of the retainer 16 and have edges 22B that are spaced from one another at a distance slightly less than the balls 14 to be received in the pockets 18. These flanges 22A are provided radially outwardly from the main body portion 20 of the retainer. The retainer 16 further includes radially inwardly directed fingers 24A, 24B, 24C and 24D, which are located between adjacent pockets 18, see especially FIGS. 3, 4, 5 and 6. As will be best appreciated from these figures, four fingers such as those 24A–24D are associated with each ball pocket 18 and each pair of adjacent fingers such as 24A–24B and 24C–24D are spaced from one another by a gap 26, as seen in FIG. 6 and other of the figures.

The embodiment of the retainer described above in accordance with the invention may be made in the manner now to be described in connection with FIGS. 7–9. If desired, the construction may alternatively employ only a single inwardly extending finger between any two adjacent ball pockets in lieu of the dual finger construction. Referring first to FIGS. 7A and 7B, the retainer ring 16 is shown therein in its rough form and may be made as by casting or forging or may be made from suitable bar or tubing stock. In such rough form, the ring 16 may include the ring main body portion 20 with roughly shaped cylindrical holes or apertures therein and with metal portions 23 radially inwardly extending from the main body portion. This retainer ring 16 further preferably includes a pair of annular flange-like extensions 22 on the main body portion 20 at the sides thereof, and these reside radially outwardly of the main body portion.

The roughly formed retainer ring 16 is then machined to the form shown in FIGS. 8A and 8B. This is achieved by first forming a gap 26 in the metal portions 23 seen in FIG. 7B, to produce the inwardly extending finger pairs 24A–24B for example, as shown in FIG. 8B. The roughly formed ball pockets shown in FIGS. 7A and 7B are then enlarged by suitable machining to generally cylindrical shape, of proper size to receive the balls 14. Such machining is accomplished by means of any suitable tool, such as for example, a cherry reamer. As the tool is moved axially into the pocket 18, generally spherically shaped surfaces 28A, 28B, 28C and 28D are formed on the inwardly extending fingers 24A, 24B, 24C and 24D respectively, as seen in FIGS. 3–6, 8A and 8B. These spherically shaped surfaces 28A–28D form generally spherical seats for the balls 14 to prevent the same from falling radially inwardly out of the retainer 16.

The annular flange-like extensions 22 of FIGS. 7A and 7B are then machined to form the flanges 22A in such a manner that they extend at an angle intermediate the axial and radial imaginary lines of the retainer 16, as best seen in FIG. 8B.

After the formation of these flanges 22A in the manner described, a forming or rolling procedure is performed whereby the flanges are bent by a cold working process inwardly toward the central axis of the retainer. This is performed by any suitable metal forming tool, such as for example, a roller 30, which is rotated about its axis 32, as seen in FIG. 8B. During this process the retainer 16 is also rotated, as will be apparent to those knowledgeable in the art. During this operation the roller 30 is of course urged toward the axis of the retainer 16 so that the flange may be deformed inwardly. When this flange rolling process is complete, the flanges 22A will be in the positions shown in FIGS. 9A and 9B. From FIG. 9B it will be seen that the edges 22B of the flanges 22A face one another and it will be further appreciated that these edges are spaced apart by a distance which is slightly less than the diameter of the balls to be received in the pockets 18. As a result, these flanges form outer limit ball retention means by reason of point contact between the points 22C on the flanges 22A and the surface of the balls, as will be clear especially from FIGS. 6 and 9B. It will also be seen that the top surfaces of the flanges 22A form a generally straight line with the machined surfaces 21 shown in FIG. 8B, to produce a generally straight line continuous surface 25 as seen in FIG. 9B, which may be employed to make the retainer 16 outer-land-riding on the inner surface of the bearing outer ring with which it is used.

In FIG. 6 one of the balls 14 is illustrated in two different positions. The position indicated by the solid line 14A is that of the ball within the ball filled retainer 16 when the retainer is mounted in the bearing assembly. The upper position indicated by the dashed lines 14B illustrates the position of the ball when held in its outer radial position by the point contact provided with the ball surfaces by means of the points 22C on the edges 22B of opposed flanges 22A. In FIG. 5 the dashed lines 14C illustrate the ball in its lowermost position where it is restrained from falling radially inwardly out of the retainer 16 by virtue of the seat provided by the four generally arcuate surfaces 28A–28D on the inwardly extending fingers 24A–24D.

Referring again to FIG. 5, the ball 14 is inserted in the retainer by urging the same in a radially outward direction past the spherical surfaces 28A–28D on the fingers 24A–24D until it "pops" into the pocket 18. For this purpose the fingers 24A–24D are designed to have a length/thickness ratio that will provide sufficient elasticity to allow the ball to spread the fingers laterally enough to cause the ball to pass into its pocket without exceeding the elastic limit of the fingers. As soon as the ball passes into its pocket, the fingers of course return to their normal positions to restrain the ball from falling radially inwardly out of its pocket.

FIG. 10 shows a further embodiment of the invention wherein a retainer 16' is formed from a main body ring portion 20' and flange members 32. These flange members 32 are formed individually and apart from the ring main body portion 20' and are secured thereto by any suitable means, such as for example, spot welds 33. The flanges 32 are shown as having inner edges 34 which are spaced apart a distance greater than the diameter of the balls 14' and accordingly the ball retention means on these flanges take the form of opposed flange extensions 36 having inner edges which are spaced apart slightly less than the diameter of the balls.

It will be appreciated, particularly by those knowledgeable in the art, that this invention provides an improved bearing retainer construction whereby a significantly greater amount of ball freedom or roll out is achieved. Furthermore this invention makes it possible to provide this feature in retainers of very small size where conventional retainer constructions cannot provide sufficient ball freedom. Additionally, as a result of the improved retainer construction provided herein, and also by virtue of the improved method of manufacture described herein, it is now more economical to manufacture retainers requiring relatively large ball roll out and relatively large ball-to-pocket clearance.

While the foregoing description sets forth the principles of the invention in connection with specific apparatus, it is to be understood that the description is made only by way of example and not as a limitation of the scope of the invention as set forth in the objects thereof and in the accompanying claims.

I claim:
1. A retainer for a ball bearing comprising:
   a ring having a plurality of generally radial holes for receiving balls,
   said ring having means extending inwardly between adjacent holes and bordering said holes at the radially inner sides,
   each of said means having arcuate and generally op- posed surfaces narrowing said holes at the radially inner ends to engage and stop the balls from falling radially inwardly through the holes, said ring at the outside having outer limit ball retention means located radially beyond the outer circumference of the body center portion of said ring, said latter means comprising flange-like members at opposite sides of said ring and also forming an integral part thereof, said flange-like members being secured at their respective base portions to the body portion of said ring to form a circumferential undercut region between each flange-like member and said body portion, the base of each flange-like member also being located radially outwardly of said body portion, said flange-like members being of substantially less width than the diameter of said holes and having their free-ends extending in opposed relationship to each other in substantially the same plane, and the free ends of said flange-like members further having substantially point contact engagement with the surface of said balls thereby restraining the same from falling radially outwardly through said holes wherein mounted therein.

2. A retainer for a ball bearing comprising:

a ring having a plurality of generally radial holes for receiving balls, said ring having at least one generally reduced inwardly directed finger between adjacent holes and bordering said holes at the radially inner sides, each of said fingers having arcuate opposed surfaces narrowing said holes at the radially inner ends to engage and stop the balls from falling radially inwardly through the holes, said ring further having annular flanges at the sides of said ring which are located radially outwardly beyond the outer circumference of the body center portion of said ring, said flanges forming an integral part of the retainer, said flanges being spaced from one another by a distance slightly less than the diameter of said holes, said flanges having their free ends extending in opposed relationship to each other in substantially the same plane, said flanges being secured at their respective base portions to the body portion of said ring to form a circumferential undercut region between each flange and body portion, the base of each flange also being located radially outwardly of said body portion, and the free ends of said flanges having substantial point contact with the surfaces of said balls, to form outer limit ball retention means, whereby the balls are restrained from falling radially outwardly out of said retainer when mounted therein.

3. The invention described in claim 2 wherein said ball outer limit retention means comprise the innermost facing edges of said flanges.

4. The invention described in claim 2 wherein said flanges comprise individual flange members made integral with the body of said ring to retain said balls therein.

5. The invention described in claim 4 wherein said flanges carry projections adjacent to said holes, said projections forming said outer limit ball retention means.

References Cited

UNITED STATES PATENTS

| 1,915,287 | 2/1933 | Bott | 308—201 |
| 3,027,206 | 3/1962 | Potter | 308—201 |

FOREIGN PATENTS

| 410,802 | 5/1910 | France. |

MARTIN P. SCHWADRON, *Primary Examiner.*

FRANK SUSKO, *Assistant Examiner.*